US012227461B2

(12) United States Patent
Barbati

(10) Patent No.: US 12,227,461 B2
(45) Date of Patent: Feb. 18, 2025

(54) INTERFACE MATERIAL FORMULATIONS FOR ADDITIVE FABRICATION

(71) Applicant: Desktop Metal, Inc., Burlington, MA (US)

(72) Inventor: Alexander C. Barbati, Melrose, MA (US)

(73) Assignee: Desktop Metal, Inc., Burlington, MA (US)

( * ) Notice: Subject to any disclaimer, the term of this patent is extended or adjusted under 35 U.S.C. 154(b) by 602 days.

(21) Appl. No.: 17/583,825

(22) Filed: Jan. 25, 2022

(65) Prior Publication Data

US 2022/0250991 A1 Aug. 11, 2022

Related U.S. Application Data

(60) Provisional application No. 63/141,820, filed on Jan. 26, 2021.

(51) Int. Cl.
*B29C 64/141* (2017.01)
*B33Y 70/00* (2020.01)
(Continued)

(52) U.S. Cl.
CPC .......... *C04B 35/638* (2013.01); *B29C 64/141* (2017.08); *B33Y 70/00* (2014.12);
(Continued)

(58) Field of Classification Search
None
See application file for complete search history.

(56) References Cited

U.S. PATENT DOCUMENTS 10,456,833 B2 10/2019 Gibson et al.
2017/0170441 A1 6/2017 Arnold et al.
(Continued)

FOREIGN PATENT DOCUMENTS

WO WO 2020-023041 A1 1/2020

OTHER PUBLICATIONS

International Search Report and Written Opinion mailed May 4, 2022 in connection with International Application No. PCT/US2022/013674.

*Primary Examiner* — Richard A. Huhn
(74) *Attorney, Agent, or Firm* — VIERING, JENTSCHURA & PARTNER mbB

(57) ABSTRACT

Improved formulations of an interface material are described. These formulations may, in at least some cases, match and/or accommodate dimensional changes in the part and/or support structure throughout thermal processing (e.g., debind and sintering, or sintering only). Furthermore, these formulations may also maintain the property of resisting bonding between the interface and the part and/or support structure while also maintaining a physical separation between the part and support structure. In some cases, an improved interface material may accommodate strain associated with the shrinkage of a part (and optionally support structure) during sintering while also minimally impacting the ability of the part (and optionally support structure) to shrink or otherwise change in dimension. In some cases, the interface material may include one or more fugitive phases that are removed during thermal processing (e.g., through pyrolysis of the fugitive phase(s)).

20 Claims, 9 Drawing Sheets

(51) Int. Cl.

| | |
|---|---|
| ***B33Y 70/10*** | (2020.01) |
| ***C04B 35/634*** | (2006.01) |
| ***C04B 35/638*** | (2006.01) |
| ***C04B 35/64*** | (2006.01) |
| *B22F 10/18* | (2021.01) |

(52) U.S. Cl.

CPC ........ *B33Y 70/10* (2020.01); *C04B 35/63408* (2013.01); *C04B 35/63432* (2013.01); *C04B 35/63452* (2013.01); *C04B 35/63456* (2013.01); *C04B 35/6346* (2013.01); *C04B 35/63468* (2013.01); *C04B 35/6348* (2013.01); *C04B 35/63488* (2013.01); *C04B 35/64* (2013.01); *B22F 10/18* (2021.01); *C04B 2235/3206* (2013.01); *C04B 2235/3217* (2013.01); *C04B 2235/3234* (2013.01); *C04B 2235/3248* (2013.01); *C04B 2235/3427* (2013.01); *C04B 2235/3821* (2013.01); *C04B 2235/386* (2013.01); *C04B 2235/3865* (2013.01); *C04B 2235/5436* (2013.01); *C04B 2235/6026* (2013.01)

(56) References Cited

U.S. PATENT DOCUMENTS

| | | | | |
|---|---|---|---|---|
| 2018/0154439 | A1* | 6/2018 | Mark | B22F 5/10 |
| 2018/0370121 | A1 | 12/2018 | Demuth et al. | |
| 2019/0375014 | A1 | 12/2019 | Kernan et al. | |
| 2021/0324216 | A1* | 10/2021 | Shields | B22F 10/14 |
| 2021/0394265 | A1* | 12/2021 | Rushkin | B22F 1/10 |

* cited by examiner

600

INTERFACE MATERIAL FORMULATIONS FOR ADDITIVE FABRICATION

CROSS-REFERENCE TO RELATED APPLICATIONS

The present application claims the benefit under 35 U.S.C. § 119(e) of U.S. Provisional Patent Application No. 63/141,820, filed Jan. 26, 2021, titled "Improved Interface Material Formulations for Additive Fabrication," which is hereby incorporated by reference in its entirety.

TECHNICAL FIELD

Various aspects of the present disclosure relate generally to systems and methods for fabricating parts through additive manufacturing, and, in some cases, for fabricating metal parts through additive manufacturing.

BACKGROUND

Metal injection molding (MIM) is a metalworking process useful in creating a variety of metal objects. A mixture comprising powdered metal and one or more binders may form a "feedstock" capable of being molded, when heated, into the shape of a desired object. The initial molded part, also referred to as a "green part," may then undergo a preliminary debinding process (e.g., solvent debinding) to remove primary binder while leaving secondary binder intact, followed by a sintering process. During sintering, the part may be heated to vaporize and remove the secondary binder (thermal debinding) and brought to a temperature near the melting point of the powdered metal, which may cause the metal powder to densify into a solid mass, thereby producing the desired metal object. A similar process can be used to shape other materials such as ceramic and composite materials. A process that includes nearly all of the above materials as well as metals and alloys is known as powder injection molding (PIM).

Additive manufacturing, which includes three-dimensional (3D) printing, includes a variety of techniques for manufacturing a three-dimensional object by successively forming portions of the object (e.g., successively forming layers, strands, volumes of material (such as voxels), and the like). Additive fabrication devices may in some cases form parts from a feedstock comparable to that used in MIM or PIM, thereby creating a green part without the need for a mold. The green part may then undergo debinding and sintering processes to produce a final part.

SUMMARY

According to some aspects, a composition for additive fabrication is provided, the composition comprising a continuous phase, particles of a first material embedded within the continuous phase, the first material including a thermoset polymer and/or a thermoplastic, and particles of an inorganic material embedded within the continuous phase, wherein the particles of the first material and the particles of the inorganic material combined are present in an amount between 40% and 75% by volume of the composition.

According to some aspects, a method of fabricating a part through additive fabrication, the method comprising depositing one or more layers of an interface material, the interface material comprising a continuous phase, particles of a first material embedded within the continuous phase, the first material including a thermoset polymer and/or a thermoplastic, and particles of an inorganic material embedded within the continuous phase, and depositing one or more layers of a build material at least partially over and in contact with the one or more layers of the interface material, the build material comprising at least one metal.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1A:
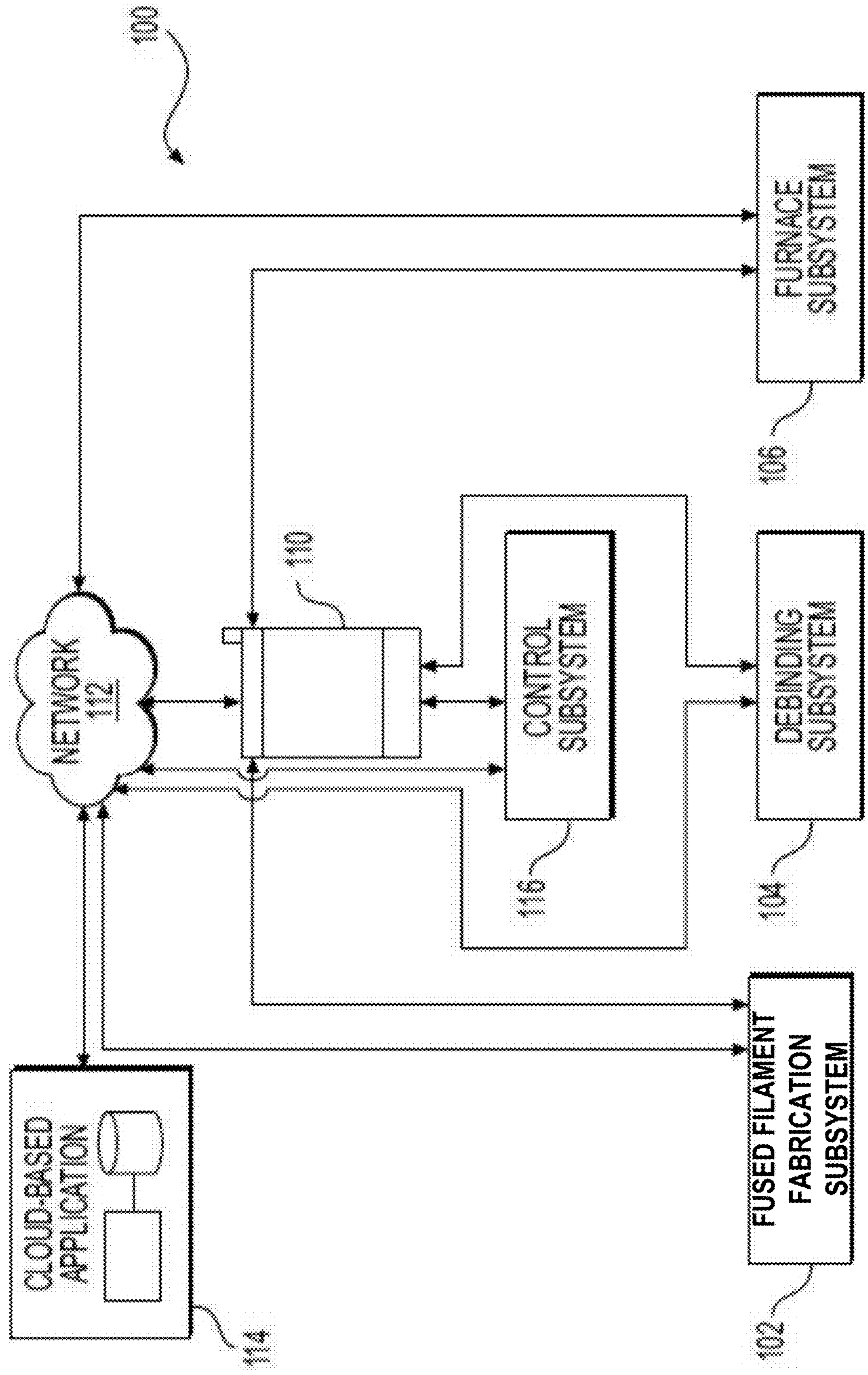
FIG. 1A is a block diagram of an additive manufacturing system according to some embodiments.

Fused Filament Fabrication (FFF) is a type of additive fabrication in which a build material (also called a feedstock) is extruded onto a substrate, such as a build platform, to form an object. Generally, the build material includes some kind of thermoplastic that is pushed through a heated extruder head. In some cases, the heated extruder head moves relative to the build platform during the deposition process resulting in the successive formation of the object. In one approach to FFF-style fabrication sometimes referred to as Bound Metal Deposition (BMD), the build material may include one or more powders so that the fabricated part includes a solid in powder form in addition to other components. The powders within the build material may include, either individually or as a part of a mixture of powders, metallic powders, ceramic powders, oxide powders, ceramic oxide powders, and/or carbide powders. In some approaches, these other components may include one or more binders that hold the powder(s) together, and which are removed subsequent to fabrication of the part. The debound part may then be sintered in a furnace to produce a solid metal object. In some cases, at least some debinding may occur in a furnace through thermal debinding. Irrespective of whether debinding and/or sintering are performed in a furnace and/or otherwise, any stages of heating to perform debinding and/or sintering are generally referred to as "thermal processing" below.

In some cases, a part fabricated through FFF may include a support structure that mechanically supports the part during fabrication. Since FFF technologies are generally limited in their ability to form unsupported material, often a support structure is necessary to mechanically hold up the part during fabrication and ensure that layers of material do not sag or otherwise deform. These support structures can be removed after fabrication of the part. In the case of plastic build materials, support structures may be easily removed and the region of the part that was coupled to the support structure easily cleaned up. For certain build materials such as those including metal powders, however, this process is far more difficult, because it may require metal machining of the completed part to remove the support structure and produce the desired shape.

As a result, some FFF devices are configured to deposit a material between a support structure and a part during fabrication so that the support structure provides the desired mechanical support to the part but allows the support structure to be more easily removed from the part after fabrication. For instance, a BMD process may deposit a interface material between a metallic support structure and metallic part (or between regions of the part), allowing the part to be easily separated from the support structure after sintering. In some cases, the interface material may be a build material that comprises a ceramic powder. When utilizing such an interface material, the support structure and interface provide mechanical support not only during fabrication but also during thermal processing, during which the part and support structure may shrink.

Conventional interface materials may, however, change shape when heated in a different manner to the part and/or support structure. For instance, the magnitude of the overall change in the interface's shape from the start to end of sintering may be different from that of the part and/or support structure. Additionally, or alternatively, the relative difference in changes of shape of the interface and the part and/or support may be different at various points of the sintering process (e.g., the interface and part might exhibit the same total change in shape from start to finish but may make this change at different rates). Such differences can cause distortion and stress within the part and/or support structure, which may cause warping, deformation, bending and/or cracking of the part and/or support structure.

The inventors have recognized and appreciate improved formulations of an interface material. These formulations may, in at least some embodiments, match and/or accommodate dimensional changes in the part and/or support structure throughout thermal processing (e.g., debind and sintering, or sintering only). Furthermore, these formulations may, in at least some embodiments, also maintain the property of resisting bonding between the interface and the part and/or support structure while also maintaining a physical separation between the part and support structure. In some cases, an improved interface material as described herein may accommodate strain associated with the shrinkage of a part (and optionally support structure) during sintering while also minimally impacting the ability of the part (and optionally support structure) to shrink or otherwise change in dimension. In some cases, the interface material may include one or more fugitive phases that are removed during thermal processing (e.g., through pyrolysis of the fugitive phase(s)).

According to some embodiments, an improved interface material may comprise a continuous phase and at least a first discrete phase and a second discrete phase. The discrete phases may comprises particles embedded within the continuous phase. The first discrete phase may be selected to pyrolize, degrade, or otherwise substantially vacate from the fabricated object in the temperature range from 200° C. to 600° C. during thermal processing. The second discrete phase may be selected to remain separate from (e.g., not attached to, not strongly bonded and/or sintered to) the part and the support structures during sintering. The continuous phase may also be selected to pyrolize, degrade, or otherwise substantially vacate from the fabricated object during sintering so that, subsequent to sintering, only the second discrete phase may remain to provide an interface at the boundary of the part and/or support. In some cases, the first and second discrete phase may comprise particles having comparable sizes. In some cases, the second discrete phase may comprise particles that are much smaller than particles of the first discrete phase, so that the interface material is highly loaded with particles of the second discrete phase.

According to some embodiments, an improved interface material may comprise large particles with a dimension similar to that of the height of layers being formed during fabrication. The particles may comprise materials that are solid and that will resist sintering, such as ceramics and/or high melting point metals, and may comprise solid beads of such material(s). As a result of forming an interface from an interface material comprising these particles, the interface may not be able to shrink much in the layering direction since the interface material is spanned by a solid particle.

According to some embodiments, an improved interface material may comprise particles that are themselves formed from several smaller sub-particles. During sintering, the agglomerated interface particles may tend to sinter inward—toward the center of each agglomerate particle—rather than sintering to form bridges across adjacent agglomerates. Since the material comprising the solids in the interface material will not tend to sinter (or will tend to sinter to a lesser extent than the neighboring part), the loading of solids within the interface material may be selected to accommodate the shrinkage of the part and support structures.

For purposes of illustration, FIGS. 1A-1D depict a conventional process of forming an additive fabricated part using Fused Filament Fabrication (FFF) to produce a green part, following by solvent debinding to produce a brown part, followed by sintering in a furnace to produce a final part.

FIG. 1A is a block diagram of an additive manufacturing system according to some embodiments of the disclosure. System 100 includes an additive fabrication device (also sometimes called a three-dimensional (3D) printer) such as a fused filament fabrication (FFF) subsystem 102, a debinding subsystem 104 and a furnace subsystem 106 for treating the green part after fabrication. Fused filament fabrication subsystem 102 may be used to form an object from a build material, for example, by depositing successive layers of the build material onto a build plate. The build material may include metal powder and/or a ceramic powder (e.g., a ceramic oxide powder), and at least one binder material. In some embodiments, the build material may include a primary binder and a secondary binder (e.g., a polymer such as polypropylene).

Debinding subsystem 104 may be configured to treat the green part produced by fused filament fabrication subsystem 102 by performing a first debinding process in which a primary binder material may be removed from the green part. As described above, the first debinding process may traditionally be a solvent debinding process, as will be described in further detail with reference to FIG. 1C. In such cases, the primary binder material may dissolve in a debinding fluid while the secondary binder material remains, holding the metal particles in place in the brown part.

Furnace subsystem 106 may be configured to treat the brown part by performing a secondary debinding process in which the secondary binder and/or any remaining primary binder may be vaporized and removed from the printed part. In some embodiments, the secondary debinding process may comprise a thermal debinding process in which the furnace subsystem 106 may be operated to heat the part to vaporize the secondary binder (or otherwise convert the secondary binder to a gas).

As shown in FIG. 1A, system 100 may also include a user interface 110, which may be operatively coupled to one or more components, for example, to fused filament fabrication subsystem 102, debinding subsystem 104, and furnace subsystem 106, etc. In some embodiments, user interface 110 may be a remote device (e.g., a computer, a tablet, a smartphone, a laptop, etc.) or an interface incorporated into system 100, e.g., on one or more of the components. User interface 110 may be wired or wirelessly connected to one or more of fused filament fabrication subsystem 102, debinding subsystem 104, and/or furnace subsystem 106. System 100 may also include a control subsystem 116, which may be included in user interface 110, or may be a separate element.

Fused filament fabrication subsystem 102, debinding subsystem 104, furnace subsystem 106, user interface 110, and/or control subsystem 116 may each be connected to the other components of system 100 directly or via a network 112. Network 112 may include the Internet and may provide communication through one or more computers, servers, and/or handheld mobile devices, including the various components of system 100. For example, network 112 may provide a data transfer connection between the various components, permitting transfer of data including, e.g., part geometries, printing material, one or more support and/or support interface details, printing instructions, binders, heating and/or sintering times and temperatures, etc., for one or more parts or one or more parts to be printed.

Moreover, network 112 may be connected to a cloud-based application 114, which may also provide a data transfer connection between the various components and cloud-based application 114 in order to provide a data transfer connection, as described above. Cloud-based application 114 may be accessed by a user in a web browser, and may include various instructions, applications, algorithms, methods of operation, preferences, historical data, etc., for forming the part or object to be printed based on the various user-input details. Alternatively or additionally, the various instructions, applications, algorithms, methods of operation, preferences, historical data, etc., may be stored locally on a local server (not shown) or in a storage and/or processing device within or operably coupled to one or more of fused filament fabrication subsystem 102, debinding subsystem 104, sintering furnace subsystem 106, user interface 110, and/or control subsystem 116. In this aspect, fused filament fabrication subsystem 102, debinding subsystem 104, furnace subsystem 106, user interface 110, and/or control subsystem 116 may be disconnected from the Internet and/or other networks, which may increase security protections for the components of system 100. In either aspect, an additional controller (not shown) may be associated with one or more of fused filament fabrication subsystem 102, debinding subsystem 104, and furnace subsystem 106, etc., and may be configured to receive instructions to form the printed object and to instruct one or more components of system 100 to form the printed object.

Figure 1B:
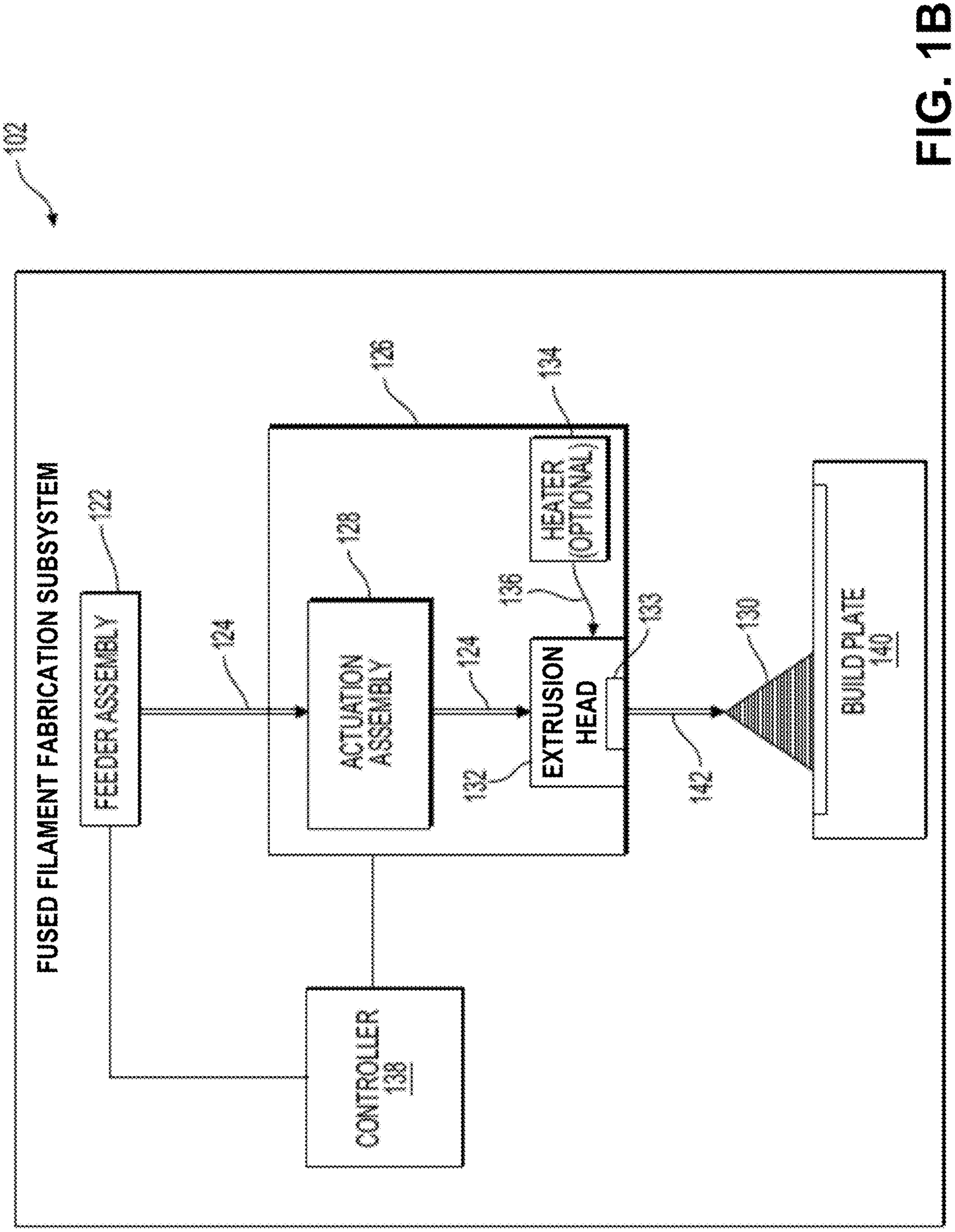
FIG. 1B is a block diagram of an illustrative Fused Filament Fabrication (FFF) subsystem of system of FIG. 1A, according to some embodiments.

FIG. 1B is a block diagram of an illustrative Fused Filament Fabrication (FFF) subsystem, according to some embodiments. In the example of FIG. 1B, the fused filament fabrication subsystem 102 may extrude a build material 124 (which may also be referred to as a feedstock 124) to form a three-dimensional part. As described above, the build material may include a mixture of metal powder and a binder containing one or more components. In some embodiments, the build material may include a mixture of a ceramic powder and a binder containing one or more components. In general, the build material may include any combination of metal powder, plastics, wax, ceramics, polymers, among others. In some embodiments, the build material 124 may come in the form of a rod or filament comprising a composition of metal powder and one or more binder components (e.g., a primary and a secondary binder).

Fused filament fabrication subsystem 102 may include an extrusion assembly 126 comprising an extrusion head 132. Fused filament fabrication subsystem 102 may include an actuation assembly 128 configured to move the build material 124 into the extrusion head 132. For example, the actuation assembly 128 may be configured to move a rod of build material 124 into the extrusion head 132. In some embodiments, the build material 124 may be continuously provided, e.g., as a spool of feedstock filament or fiber from the feeder assembly 122 to the actuation assembly 128, which in turn may move the build material 124 into the extrusion head 132. In some embodiments, the actuation assembly 128 may employ a linear actuator to continuously grip or push the build material 124 from the feeder assembly 122 towards and into the extrusion head 132.

In some embodiments, the fused filament fabrication subsystem 102 includes a heater 134 configured to generate heat 136 such that the build material 124 moved into the extrusion head 132 may be heated to a workable state. In some embodiments, the heater 134 may be integral to the extrusion head 132. As used herein, a "workable state" of a build material may refer to a build material that is able to be actuated through the extrusion head. In some cases, a "workable state" may also refer to a build material able to adhere to the build plate and/or cohere to successively deposited volumes of build material.

The build material 124 may be heated to a temperature at or below the temperature of the heater, depending on how long the build material is in proximity to the heater and/or how close the build material is to the heater. For example the heater may, when operated, heat to a temperature that is between 160° C. and 200° C., and when the build material is extruded through the extrusion apparatus (to which the heater may be integral as noted above), the build material may be heated to within several degrees of the operating temperature of the heater. By way of example, for a heater temperature of 165° C., the temperature of the build material may be heated up to, at most of 165° C. The temperature of the build material during extrusion may be referred to herein as a "deposition temperature." In the above example, for instance, the deposition temperature of the build material is 165° C.

According to some embodiments, a deposition temperature during additive fabrication may be equal to or greater than 100° C., 120° C., 140° C., 160° C., 170° C., 180° C., 190° C. or 200° C. According to some embodiments, a deposition temperature during additive fabrication may be less than or equal to 230° C., 220° C., 210° C., 200° C., 190° C., 180° C., 170° C., 160° C., 140° C., 120° C., or 100° C. Any suitable combinations of the above-referenced ranges are also possible (e.g., a deposition temperature during additive fabrication of greater or equal to 140° C. and less than or equal to 170° C.).

In some embodiments, the heated build material 124 may be extruded through a nozzle 133 to extrude workable build material 142 onto a build plate 140. It is understood that the heater 134 is an exemplary device for generating heat 136, and that heat 136 may be generated in any suitable way, e.g., via friction of the build material 124 interacting with the extrusion assembly 126, in alternative embodiments. While there is one nozzle 133 shown in FIG. 1B, it is understood that the extrusion assembly 126 may comprise more than one nozzle in other embodiments. In some embodiments, the fused filament fabrication subsystem 102 may include another extrusion assembly (not shown in FIG. 1B) configured to extrude a non-sintering ceramic material onto the build plate 140.

In some embodiments, the fused filament fabrication subsystem 102 may comprise multiple instances of the feeder assembly 122 and extrusion assembly 126, wherein each instance provides for the extrusion of a different build material onto the build plate 140. For instance, a second instance of each of the feeder assembly 122 and extrusion assembly 126 may be configured to deposit an interface material. As described above, an interface material may provide a separation between a support structure and a part and may resist bonding to the part and support structure, thereby allowing the support structure and part to be separated after thermal processing.

In some embodiments, the fused filament fabrication subsystem 102 comprises a controller 138. The controller 138 may be configured to position the nozzle 133 along an extrusion path (also referred to as a toolpath) relative to the build plate 140 such that the workable build material is deposited on the build plate 140 to fabricate a three-dimensional green part 130. The controller 138 may be configured to manage operation of the fused filament fabrication subsystem 102 to fabricate the green part 130 according to a three-dimensional model. In some embodiments, the controller 138 may be remote or local to the metal printing subsystem 102. The controller 138 may be a centralized or distributed system. In some embodiments, the controller 138 may be configured to control a feeder assembly 122 to dispense the build material 124. In some embodiments, the controller 138 may be configured to control the extrusion assembly 126, e.g., the actuation assembly 128, the heater 134, the extrusion head 132, or the nozzle 133. In some embodiments, the controller 138 may be included in the control subsystem 116.

Fused filament fabrication subsystem 102 may separate the ambient environment inside and outside of the printer (e.g., the laboratory or office space) to provide for a controlled ambient environment within the printer. The subsystem may also include a filtration mechanism to capture any material that leaves the binder (from sublimation, evaporation, or reaction to a gaseous compound) from the printing process. Alternately or in addition, fused filament fabrication 102 may include or be in connection with a system that may provide a controlled fabrication temperature and atmosphere, and a filtration mechanism.

Figure 1C:
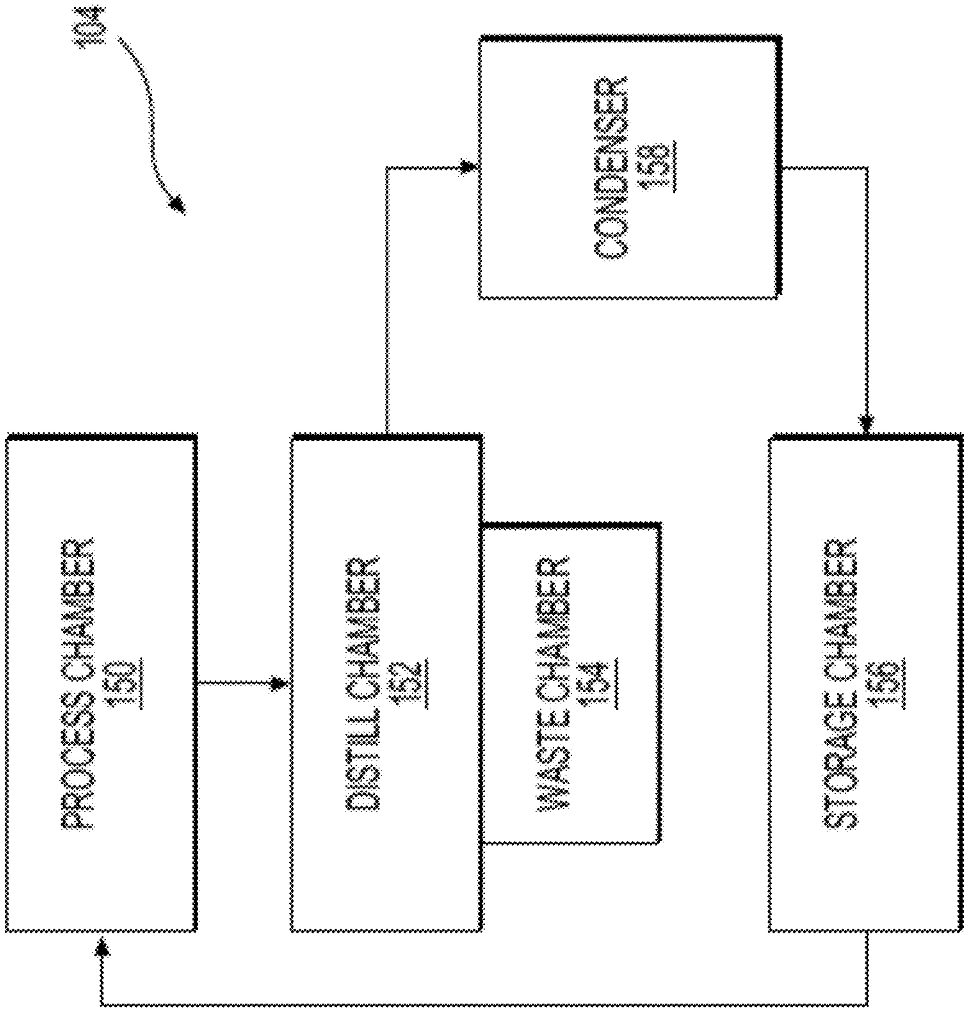
FIG. 1C is a block diagram of an illustrative debinding subsystem of the system of FIG. 1A, according to some embodiments.

FIG. 1C depicts a block diagram of a traditional chemical debinder subsystem 104 for debinding a green part 130. The chemical debinder subsystem 104 may include a process chamber 150, into which the green part 130 may be inserted for a first debinding process. The first debinding process may be a solvent debinding process that may be performed in a storage chamber containing debinding fluid, e.g., a solvent. The storage chamber 156 may comprise a port which may be used to fill, refill, and/or drain the storage chamber 156 with the debinding fluid. The storage chamber 156 may be removably attached to the debinder subsystem 104. For example, the storage chamber 156 may be removed and replaced with a replacement storage chamber (not shown in FIG. 1C) to replenish the debinding fluid in the debinding subsystem 104. The storage chamber 156 may be removed, refilled with debinding fluid, and reattached to the debinding subsystem 104. As described above, embodiments of the present disclosure may remove the need for a chemical debinder, and the primary binder may be removed via sublimation and/or evaporation, as will be described further below. In such embodiments, all thermal processing, including removing of the primary binder through sublimation, removal of the secondary binder through vaporization, and sintering of the metal part, may occur in a furnace.

Figure 1D:
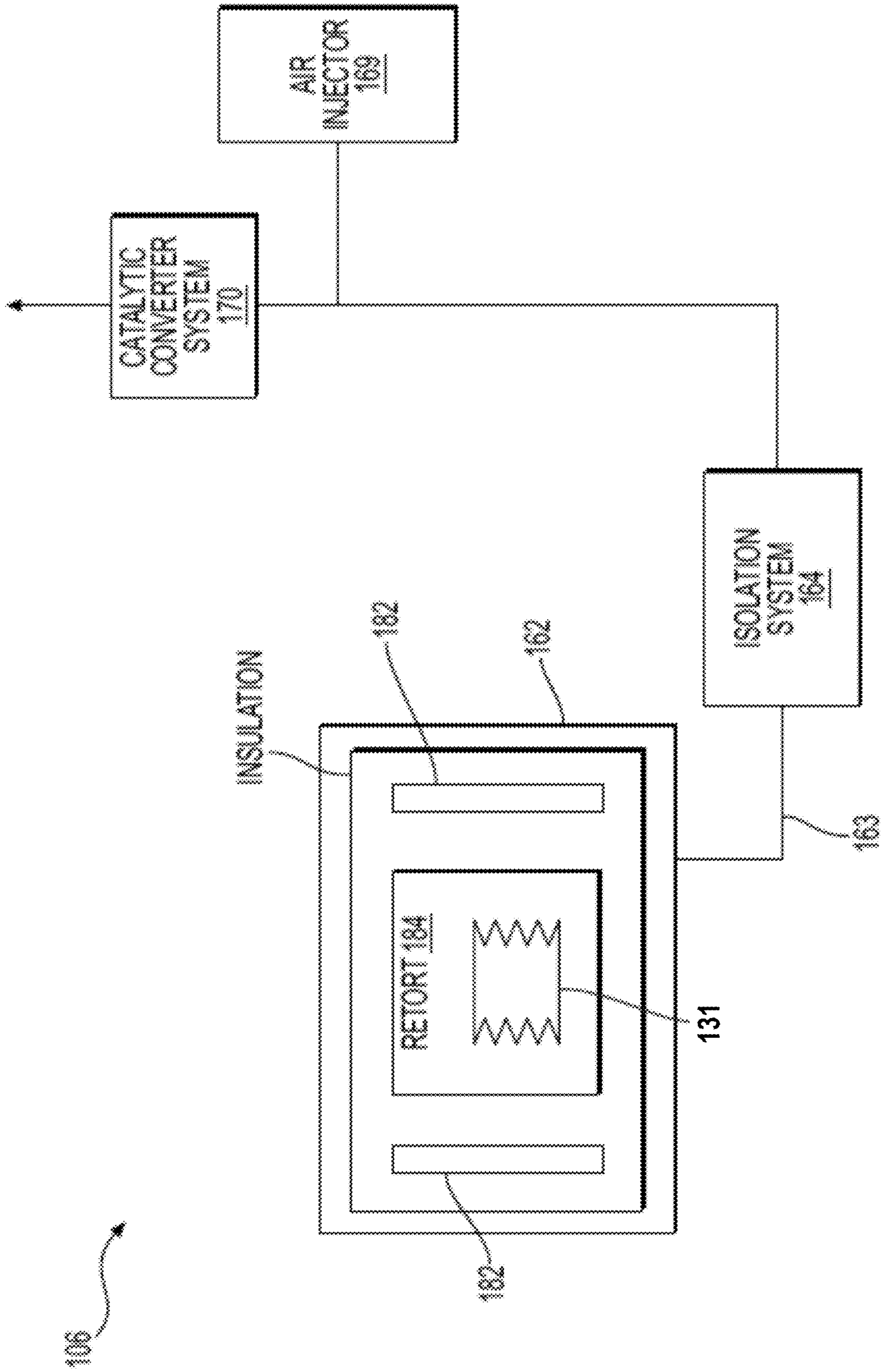
FIG. 1D is a block diagram of an illustrative furnace subsystem of the system of FIG. 1A, according to some embodiments.

FIG. 1D is a block diagram of the furnace subsystem 106 according to exemplary embodiments. The furnace subsystem 106 may include one or more of a furnace chamber 162, an isolation system 164, an air injector 169 (also referred to as an oxygen injector, which may introduce air or oxygen gas into the system), and a catalytic converter system 170.

The furnace chamber 162 may be a sealable and insulated chamber designed to enclose a controlled atmosphere. In some cases, the atmosphere in the chamber may be controlled to be substantially free of oxygen. In some embodiments, the atmosphere may be configured to be substantially free of oxygen to prevent combustion. In the context of the current disclosure, a controlled atmosphere refers to an atmosphere being controlled for at least composition and pressure. The atmosphere may be controlled to be substantially free of oxygen, in some embodiments the atmosphere is configured to be substantially free of oxygen to prevent combustion.

The furnace chamber 162 may include one or more heating elements 182 for heating chamber contents enclosed within the furnace chamber 162. As shown in FIG. 1D, the brown part 131 may be placed in the furnace chamber 162 for thermal processing. e.g., a thermal debinding process or a densifying process. In some embodiments, the furnace chamber 162 may be heated to a suitable temperature as part of the thermal debinding process in order to remove any binder components included in the brown part 131 and then may be heated to a sintering temperature to densify the part. The furnace chamber 162 may include a retort 184 with walls partially or fully enclosing the region where the brown part 131 is located. In some embodiments, the furnace chamber 162, specifically the retort 184, may include one or more shelves on which the green part 130 may be placed within the furnace chamber 162.

Gas may be introduced to the furnace chamber to affect the atmosphere surrounding the printed object during thermal processing as the brown part 131 is heated during a thermal processing, e.g., during the thermal debinding process. In some embodiments, some amount per time of the furnace atmosphere may be pumped out of the furnace chamber 162, flowed through the isolation system 164, and directed towards the catalyst converter system 170. The isolation system 164 may be configured to prevent downstream species, gas, or gas components (e.g., gas, particularly oxygen gas from air injector 169) from transporting back towards the furnace chamber 162. The isolation system 164 or catalytic converter system 170 may be configured to remove at least a portion of the toxic fumes, e.g., at least a portion of the volatilized binder components.

As noted above, the system of FIGS. 1A-1D represents a conventional system for additive fabrication that includes a solvent debinding step. As noted above, a system may instead eliminating the solvent debinding step and perform only a thermal debinding step.

Figure 2:
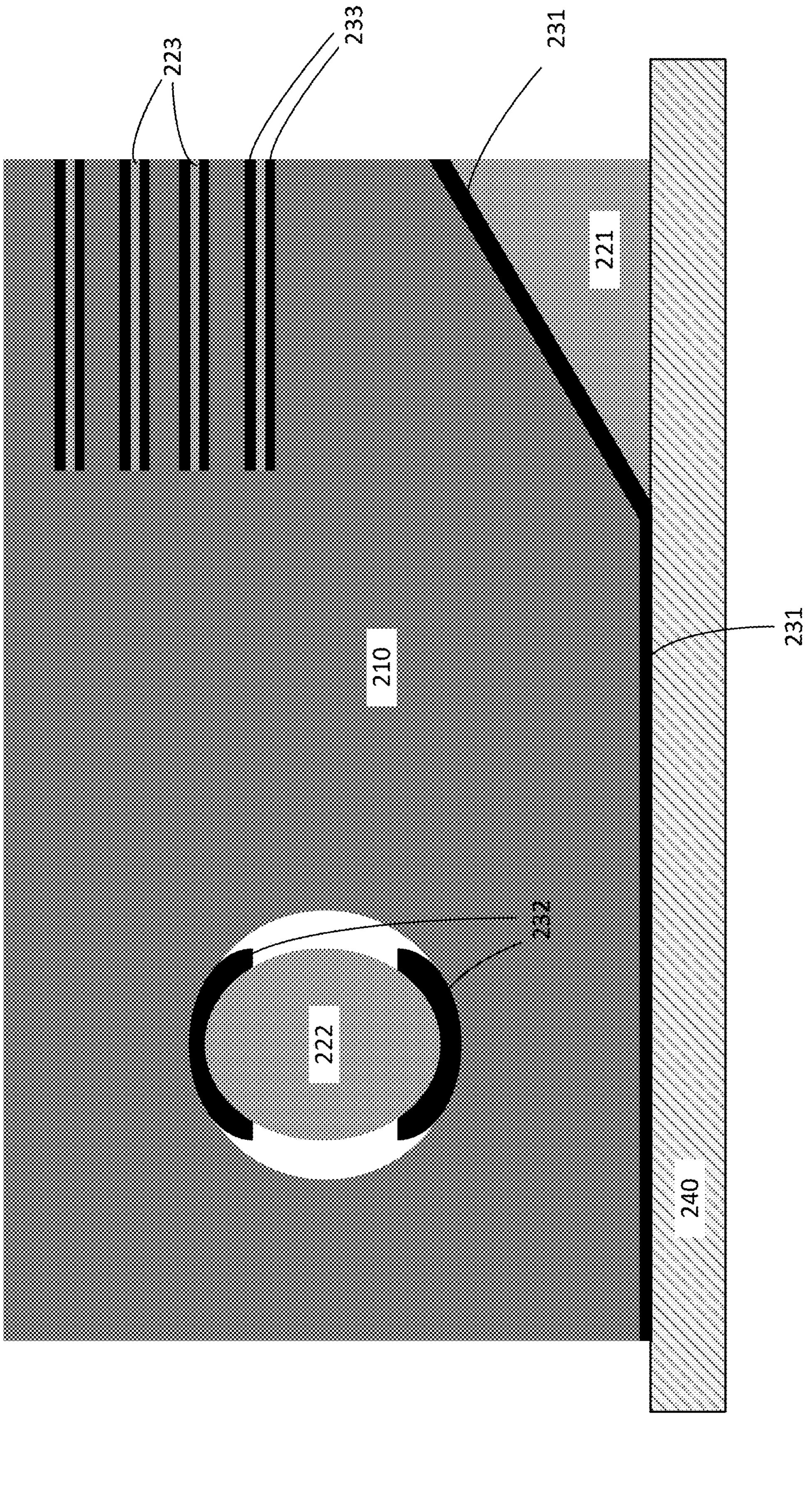
FIG. 2 depicts a cross-sectional view of an additively fabricated part, according to some embodiments.

An illustrative part is shown in cross-sectional view in FIG. 2 that includes a support structure and a part separated by an interface, according to some embodiments. In the example of FIG. 2, a part 210 has been fabricated on top of a support 221. The support structure 221 is fabricated to support the overhanging region of the part 210, and is coupled to the part via interface material 231, which may be formed from a different material than the part and the support structure and may facilitate separation of the part from the support structure after thermal processing (e.g., thermal debinding and/or sintering) is completed. The part 210 also includes an opening having a circular cross-section, which is supported by a support 222, which connects to the part via interface material 232. The part 210 further includes openings having rectangular cross-sections, which are each supported by a respective support 223, each of which connects to the part via interface material 233. The material of interface material 231, 232 and 233 may for instance include a ceramic material, for instance, such as those described in U.S. Pat. No. 10,456,833, titled "Shrinkable Support Structures," which is hereby incorporated by reference in its entirety. In the example of FIG. 2, the part, interface material and support structures are formed on a build platform 240. The support structures may be formed from the same, or a different, material as the part 210.

In some embodiments, the interface material forming layer 231 may be deposited as a covering over regions of the support structure so that the interface material prevents intimate contact between the part 210 and the support structure 221. Similarly, the interface material 232 and 233 may be deposited below and above regions of the support structures 222 and 223 so that the interface material prevents intimate contact between the part 210 and the support structures 222 and 223. The resulting separation between a support structure and the part may for instance be between 0.05 and 0.2 mm, or may be between 0.15 mm and 0.6 mm. In the example of FIG. 2, each of the regions of interface material 231, 232 and 233 may comprise one or more layers of the interface material deposited during fabrication.

As described above, when sintering a part such as part 210 the part may undergo dimensional changes, which may lead to relative difference in changes of shape of the interface and the part and/or support structure. Several techniques for producing an improved formulation of an interface material are now described. As described above, these formulations may cause the interface to match and/or accommodate dimensional changes in the part and/or support structure throughout thermal processing (e.g., debind and sintering, or sintering only). Furthermore, these formulations may, in at least some embodiments, also maintain the property of resisting bonding between the interface and the part and/or support structure while also maintaining a physical separation between the part and support structure.

Figure 3B:
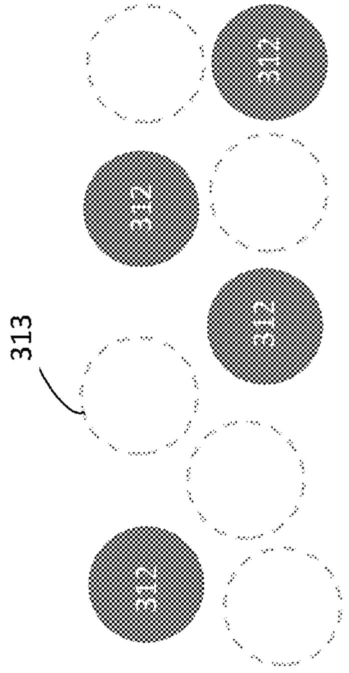
FIGS. 3A-3B depict a first example of an improved interface material that comprises a continuous phase, and at least two discrete phases, according to some embodiments.
Figure 3A:
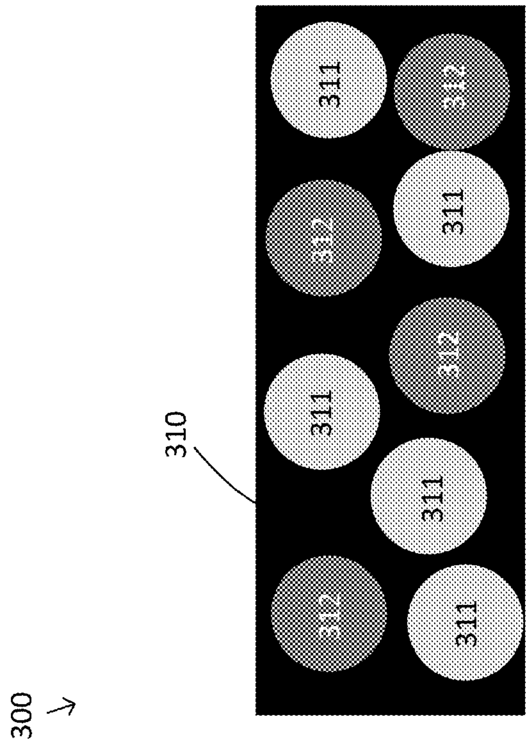

FIGS. 3A-3B depict an example of an improved interface material that comprises a continuous phase, and at least two discrete phases, according to some embodiments. In the example of FIG. 3A, the interface material 300 includes a continuous phase 310, a first discrete phase 311, and a second discrete phase 312. As shown in the example of FIG. 3A, particles of the first and second discrete phases are embedded in the continuous phase 310. In some embodiments, the particles of the first and/or second discrete phases may be mixed (e.g., evenly dispersed) within the continuous phase so that the particles have a uniform (or substantially uniform) density throughout the interface material.

During thermal processing, the temperature of the interface material 300 may be raised sufficiently that the continuous phase and the first discrete phase may be removed from the interface material, while the second discrete phase remains, as shown in FIG. 3B. Suitable materials for the continuous phase and first and second discrete phases that may have this behavior during thermal processing are described below. In some embodiments, the continuous phase and the first discrete phase may be removed, at least in part, through pyrolysis. In the example of FIG. 3B, the dashed circles 313 illustrate that the first discrete phase particles have been removed.

According to some embodiments, the continuous phase may be, or may comprise, a solid such as a wax (e.g., paraffin wax, beeswax, and the like), a waxy alcohol, small ring-containing molecules (e.g., thymol, durene, and the like), polyolefin polymers (poly(ethylene), poly(propylene), poly(isobutylene), and the like), thermoplastic elastomers (Septon, Hybrary, and Kurarity from Kuraray), tackifiers (maleic anhydride-grafted poly(propylene), terpene resin, ethylene vinyl acetate, copolymers of ethylene and methacrylic acid,), surfactants (polyoxyethylated alkylphenols, alkylphenol ethoxylates, carboxylic acid esters, long-chain amines and their salts, carboxylic acid salts, tertiary acetylenic glycols) wetting/coupling agents (titanates, zirconates, and the like), anti-oxidants, and combinations thereof.

In some embodiments, an interface material includes a continuous phase that comprises greater than or equal to 25%, greater than or equal to 30%, greater than or equal to 35%, greater than or equal to 40%, greater than or equal to 45% or greater than or equal to 50% of the interface material by volume. In some embodiments, an interface material comprises a continuous phase that comprises less than or equal to 50%, less than or equal to 45%, less than or equal to 40%, less than or equal to 35%, less than or equal to 30% or less than or equal to 25% of the interface material by volume. Combinations of the above-referenced ranges are also possible (e.g., the continuous phase comprises greater than or equal to 35% and less than or equal to 45% of the interface material by volume).

According to some embodiments, the continuous phase of the interface material may comprise between 30% and 45% (by volume or weight) of a wax-like material (e.g., waxes or waxy alcohols), a mixture of polyolefin polymers and thermoplastic elastomers representing between 20% and 30% (by volume or weight) of the continuous phase, a tackifier between 10% and 20% (by volume or weight), and 0% to 2% (by volume or weight) wetting agents, anti-oxidants, and/or surfactants.

According to some embodiments, the first and second discrete phases may each comprise particles of a solid material, with the solid particles of the first discrete phase being different to the solid particles of the second discrete phase. In some embodiments, particles of the first and second discrete phases may be configured to exhibit similar sizes (e.g., 20-40 μm diameter) and shapes (e.g., spherical, round, flake-like (oblate), fiber-like (prolate) etc. . . . ) to one another. In some embodiments, the first and second discrete phases may be configured to exhibit similar distributions of particle size, but exhibit shapes which are dissimilar (e.g., a spherical or round first discrete phase and an elongate or otherwise non-equiaxed secondary discrete phase, or vice-a-versa). In some embodiments, the first and second discrete phases may be configured to exhibit different surface roughness characteristics (e.g., a first discrete phase which is smooth relative to a second discrete phase, or vice-a-versa). In some embodiments, the first discrete phase may comprise a mixture of differently shaped solid particles.

According to some embodiments, the first discrete phase may exhibit the property that it will not melt or substantially soften prior to the pyrolization, sublimation, or during some other thermally-activated mass loss mechanism during thermal processing. In contrast, a conventional interface material may soften during thermal processing, which may lead to a flaw such as a crack, fissure, fracture, deformation, and/or warping in the interface material and/or part. In some cases, a flaw may be sufficiently subtle that, while a new feature such as a crack, etc. may not be produced, nonetheless said softening may cause a deviation from the intended dimensions of the final part.

According to some embodiments, the first discrete phase may comprise one or more thermoset polymers and/or thermoplastics. Each of said thermoset polymers and/or thermoplastics may, in some embodiments, be partially or fully cross-linked.

In some embodiments, the first discrete phase may comprise a thermoset polymer. A thermoset polymer may have an advantage of resisting deformation at elevated temperatures, whereas other polymers may be susceptible to deformation and flow. For instance, the first discrete phase may comprise a thermoset polymer such as, but not limited to, one or more poly(esters), poly(urethanes), poly(urea), melamine, epoxy-based polymers (or plastics), or combinations thereof.

In some embodiments, the first discrete phase may comprise a high temperature plastic (or polymer). High temperature plastics may exhibit suitable structural capability (such as resistance to deformation, flow, or other structural failure or rearrangement) in the absence of crosslinking. For instance, the first discrete phase may comprise poly (sulfone), poly(etherimide), poly(amideimide), other melt processable polyamides, poly(phenylsulfone), poly(phenelyne sulfide), other polysulfones, poly(etheretherketone) (PEEK), poly(etherketone), other polyarylether ketones, poly(phthalamide), or combinations thereof. A high temperature polymer may include polymers which are amorphous, as well as polymers which have any degree of crystallinity (such as semi-crystalline polymers, for example). In some embodiments, a high temperature plastic (or polymer) may include any polymer where the heat deflection temperature (according to ASTM D648 with a test stress of 1.8 MPa) exceeds 150° C.

According to some embodiments, the first discrete phase may comprise a fully or partially crosslinked polymer. Suitable polymers may include any of the polymers provided as examples above. In particular, examples of polymers or classes of polymers that may be fully or partially crosslinked include: poly(ethylene), poly(propylene), polyolefin, poly(styrene), poly(methyl methacrylate), acrylates, poly(acrylamide) and poly(vinyl alcohol). For a given polymer, increasing the degree of crosslinking will likely increase at least one or all of the elastic modulus, yield strength, failure strength, flow strength, or otherwise the rigidity of a discrete phase comprised of the polymer with the given degree of crosslinking as compared to the same polymer with a lesser degree of crosslinking, or the same polymer in an uncrosslinked state. In the above discussion of polymers with various degrees of crosslinking, thermoset polymers, and high temperature plastics (or polymers), it may be appreciated that there may be specific materials which overlap the definitions of various classes of materials, and which, therefore, may be described with several terms.

In some embodiments, an interface material includes a first discrete phase that comprises greater than or equal to 5%, greater than or equal to 10%, greater than or equal to 15%, greater than or equal to 20% or greater than or equal to 25% of the interface material by volume. In some embodiments, an interface material includes a first discrete phase that comprises less than or equal to 25%, less than or equal to 20%, less than or equal to 15%, less than or equal to 10% or less than or equal to 5% of the interface material by volume. Combinations of the above-referenced ranges are also possible (e.g., the first discrete phase comprises greater than or equal to 15% and less than or equal to 25% of the interface material by volume).

In some embodiments, the first discrete phase may be formed from a material that is solid up to an operating temperature during deposition of the interface material. This may allow the first discrete phase to remain solid during fabrication, yet as described above the first discrete phase may be removed during thermal processing. There is therefore an advantage to the first discrete phase being solid up to a temperature that is greater than operating temperature during fabrication but lower than temperatures during thermal processing. In some embodiments, the first discrete phase may be solid up to 180° C., 200° C., 220° C., 250° C., or 300° C. Polymers exhibiting various degrees of crosslinking (e.g., partially, or fully cross-linked polymers) may therefore be desirable as having such properties.

According to some embodiments, the second discrete phase may comprise one or more inorganic materials, including one or more inorganic materials that remain solid at temperatures during sintering (e.g., above 800° C.). In some embodiments, the second discrete phase may comprise alumina, mullite, zirconia, aluminum titanate, alumino silicate ceramic, aluminum nitride, magnesium oxide, boron nitride, silicon carbide, silica zircon, or combinations thereof. The second discrete phase may not necessarily be limited to oxides, but may also include carbides and/or refractory metals. By way of example, a material such as alumina may be employed when processing a temperature such as stainless steel (with an estimated peak temperature of between 1300° C. and 1350° C., depending upon the particle size and furnace conditions), whereas the processing titanium or titanium-containing alloys may require the use of a more inert ceramic such as zirconia or silicon carbide. Suitable examples of carbides may include: tungsten carbides, zirconium carbides, titanium carbides, vanadium carbides, or combinations thereof. Some examples of suitable refractory metals may include niobium, molybdenum, tantalum, tungsten, rhenium, and the like. According to some embodiments, a refractory metal may be considered to have a melting point above, or near, 2000° C. In some instances, metals with a melting point near or above 1800° C. may be considered as refractory metals, including: zirconium, titanium, vanadium, chromium, and the like. In general, the material selected for the second discrete phase may vary based upon the composition of the solid material from which the part and any support structures.

According to some embodiments, the interface material may comprise the first discrete phase at a volume fraction of between 30% and 60%, and the second discrete phase at a volume fraction of between 5% and 40%. The balance of the volume in the interface material is occupied by the continuous binder phase (e.g., up to 65% of the interface material by volume). As a further example, and for the purposes of illustration, an example embodiment of the interface material may comprise 20% by volume partially crosslinked poly(methyl methacrylate) polymer beads with an average diameter of 40 micrometers (comprising the first discrete phase), 40% alumina particles (e.g., beads) by volume with an average diameter of 35 micrometers (comprising the second discrete phase), and the remaining 40% by volume comprising a continuous binder phase of wax and/or olefinic polymer (such as poly(ethylene), poly(propylene) or the like), additional polymer(s) (such as ethylene(vinyl acetate)), and minor components at least including wetting agents. During deposition, the totality of the discrete phases comprises 60% (by volume) of the entire material. This 60% of discrete particles may be preferred for depositing the material to provide good feature fidelity.

As may be appreciated by one skilled in the art, the percentage (e.g., in the above example 60%) by volume of discrete particles in the interface formulation may be chosen to match or nearly match the volume percentage of solid particles in the formulation used in the production of the part and support structures. By matching, or nearly matching, the total amount of solids in the interface material and either or both of the part and support materials, the mechanical response of structures, objects, and layers printed from the interface, part, and support structure formulations are likely to be similar. Thus, non-uniform deformation induced by the combination of part weight and minor temperature increase (e.g., by softening of the continuous phase in the range from room temperature up to about 300° C.) of a part, support structure, and any deposited interface material will be reduced as all components are expected to exhibit the same or similar deformation behavior at moderate temperatures. Further, as the printed objects (part, support structures, and interface) achieve the degradation temperature of the first discrete phase and the continuous binder phase at or above 350° C. to approximately 600° C., any polymeric materials which are present are expected to evacuate the deposited object completely or nearly completely through one or a combination of evaporation, pyrolysis, or otherwise conversion to a gas. Following the loss of polymeric components in the interface formulation, the remaining discrete phase in the interface formulation is selected such that the solids present may provide mechanical support for the objects undergoing thermal processing at all times. Additionally, following shrinkage of the part and support structures, the volume fraction of solids in the volume previously occupied by the interface material may remain below (or not greater than) a supposed jamming threshold for spherical particles (assumed to be in the range of 50 to 60% by volume). By remaining below the jamming threshold, the interface material may accommodate the shrinkage of the part without imposing reaction forces that may lead to a flaw, crack, fracture or other part defect upon shrinkage during thermal processing.

In some embodiments, the total amount of solid material in the interface material by volume (e.g., the total volume of the first and second discrete phases) may be selected to match or nearly match the volume fraction of solids in the build material feedstock (e.g., the volume fraction of metal powder in the build material). In some implementations, for instance, the build material may comprise metal powder between 55% and 63%, but it may be as low as 40% to 55%, or as high as 63% to 75%. Volume amounts of the first and second discrete phases may be selected so that, during shrinkage during thermal processing, the second discrete phase does not impede the shrinkage (or motion) of the build material to the degree that any opposition of motion produces a flaw in the part undergoing sintering (or thermal processing). This limitation may for instance be enforced by selecting an upper limit for the second discrete phase, after shrinkage (e.g., 60% by volume although this number could be different depending upon the shape of the particles in the second discrete phase, the distribution of the particle sizes in the second discrete phase, or any other characteristic relating to how a collection of such particles would pack, arrange, or otherwise interact as a result of shrinkage as occurs during thermal processing). A lower limit for the secondary discrete phase may also be selected as a geometric percolation threshold for the particles comprising the material, which may for instance be in a range of 30% to 40% by volume for spherical particles. For materials that display a linear shrinkage of between 15 and 20%, an initial (prior to thermal processing) volume fraction of the secondary discrete phase in the range of 35% to 45% may therefore be acceptable. The balance volume fraction of the solids (volume fraction of the build material less the volume fraction of the second discrete phase) then determines the volume fraction of the first discrete phase. For a build material volume fraction in the range of 55% to 63%, a balance volume fraction of 20% for the first discrete phase may therefore be acceptable.

In the case where the interface material is to be chemically debound, the combination of the second discrete phase and the debinding chemicals may be selected such that the debinding chemicals do not dissolve the second discrete phase. Once the interface material is placed within the furnace (presumably between objects comprising a part and associated support structures), the interface material must maintain spacing of objects which are desired to remain separated. Further, the interface material may maintain the relative position and orientation of the objects, which is more challenging than maintaining separation (preventing slumping or sagging, for example). Since the any remaining continuous polymer will tend to soften and melting, motion may occur in materials which are not loaded to the point where a mechanical contact network exists through the discrete phase. Achieving mechanical contact is essential to arrest relative motion between the highly loaded support and part objects (typically in the range of 55% to 62% by volume, but may also be in the range of 45% to 55% by volume, or in the range of 62% to 75% by volume) and the intervening interface material (which is typically desired to be loaded at a lower volume fraction to permit relative shrinkage of the metal through the sintering cycle). At higher temperatures, the second discrete polymer phases begins to thermally degrade at approximately the same or similar temperatures as any remaining continuous phase polymers begin to degrade, diminishing the possibility for differential motion between the interface material and the materials comprising the support and part.

In the case where the interface material is to be thermally debound, without any preceding chemical debinding phase, the second discrete phase may be selected such that the removal of binders in the early (or first) stage of the thermal debinding process proceeds without the removal of the material comprising the second discrete phase. For example, if the first stage of a thermal debinding process includes a temperature hold at between 100° C. and 150° C. (a typical temperature range used to gently remove certain wax and wax-like materials), a second discrete phase comprising a crosslinked or lightly crosslinked poly(styrene), poly(methyl methacrylate), or suitable polymer will not be degraded and may generally maintain its shape and form during the removal of certain other components (such as certain wax-like materials). The selection of the gaseous (or chemical) atmosphere during processing may be important in causing removal of a subset of the continuous binder phase while leaving all other materials relatively unaffected at the primary debinding stage. For example, the use of an inert gas (such as argon, nitrogen, or the like) or a vacuum may prevent the chemical degradation of the continuous binder and discrete particle phases, as may occur if an aggressive gas is used (such as oxygen, carbon monoxide, air, or the like). At the completion of this first stage, the thermal processing regimen may continue to higher temperatures at which the remainder of the continuous binder phase and the second discrete phase may be removed in a manner like the previously described processes.

Figure 4B:
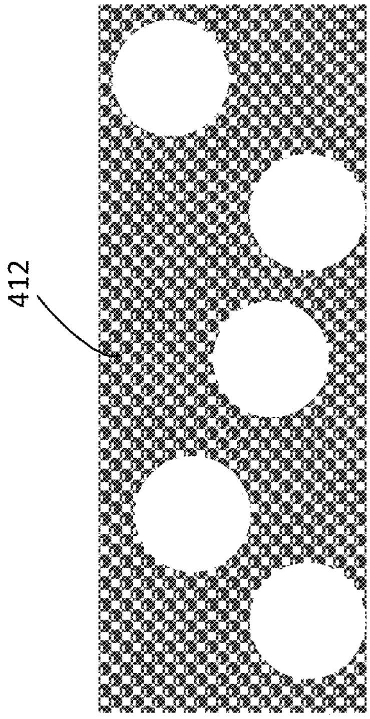
FIGS. 4A-4B depict a second example of an improved interface material that comprises a continuous phase, and at least two discrete phases, according to some embodiments.
Figure 4A:
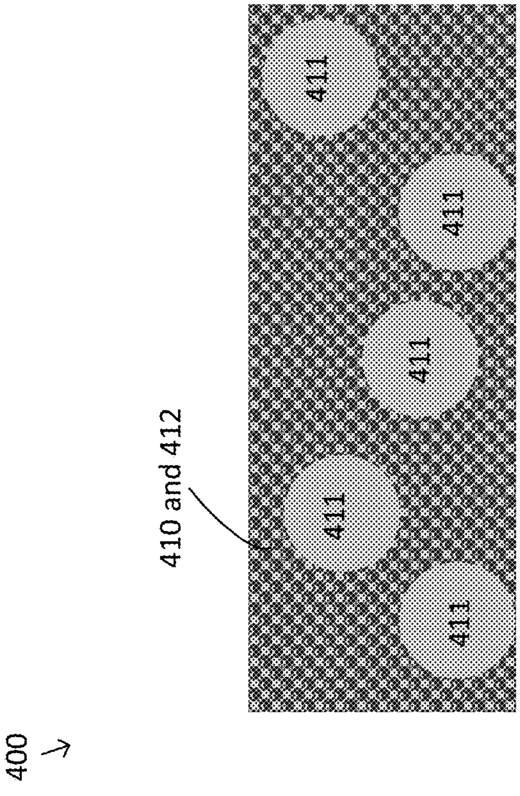

As an alternative to the example of FIGS. 3A-3B, in which the particles of the first and second discrete phases have comparable sizes, instead the second discrete phase may be formed from much smaller particles that highly load the interface material. FIGS. 4A-4B depict an example of an improved interface material with this approach, according to some embodiments.

As shown in the example of FIG. 4A, an interface material 400 comprises a continuous phase 410 in which small particles 412 of a second discrete phase are embedded. Large particles of a first discrete phase 411 are also embedded in the continuous phase. During thermal processing, the continuous phase and first discrete phase are removed, leaving the second discrete phase 412 as shown in FIG. 4B. The above description of the components shown in FIGS. 3A and 3B also apply to the example of FIGS. 4A-4B; the difference between these approaches is in the size of the particles of the second discrete phase.

In some embodiments, the mean diameter of the small particles 412 within the interface material may be greater than or equal to 100 nm, greater than or equal to 500 nm, greater than or equal to 1 μm, greater than or equal to 2 μm, greater than or equal to 5 μm or greater than or equal to 10 μm. In some embodiments, the mean diameter of the small particles 412 within the interface material may be less than or equal to 20 μm, less than or equal to 10 μm, less than or equal to 5 μm, less than or equal to 2 μm, less than or equal to 1 μm or less than or equal to 500 nm. Combinations of the above-referenced ranges are also possible (e.g., the mean diameter of the small particles 412 is greater than or equal to 1 μm and less than or equal to 5 μm, or greater than or equal to 100 nm and less than or equal to 1 μm). In some embodiments, at least 90% of the small particles 412 may have a diameter that is less than 10 μm, or less than 5 μm, or less than 2 μm.

In another improved formulation, the interface material may comprise large particles with a dimension similar to that of the height of layers being formed during fabrication. For instance, the particles may have a diameter of approximately 10 μm to 200 μm. The particles may comprise materials that are solid and that will resist sintering, such as ceramics and/or high melting point metals, and may comprise solid beads of such material(s). As a result of forming an interface from an interface material comprising these particles, the interface may not be able to shrink much in the layering direction since the interface material is spanned by a solid particle.

Figure 5A:
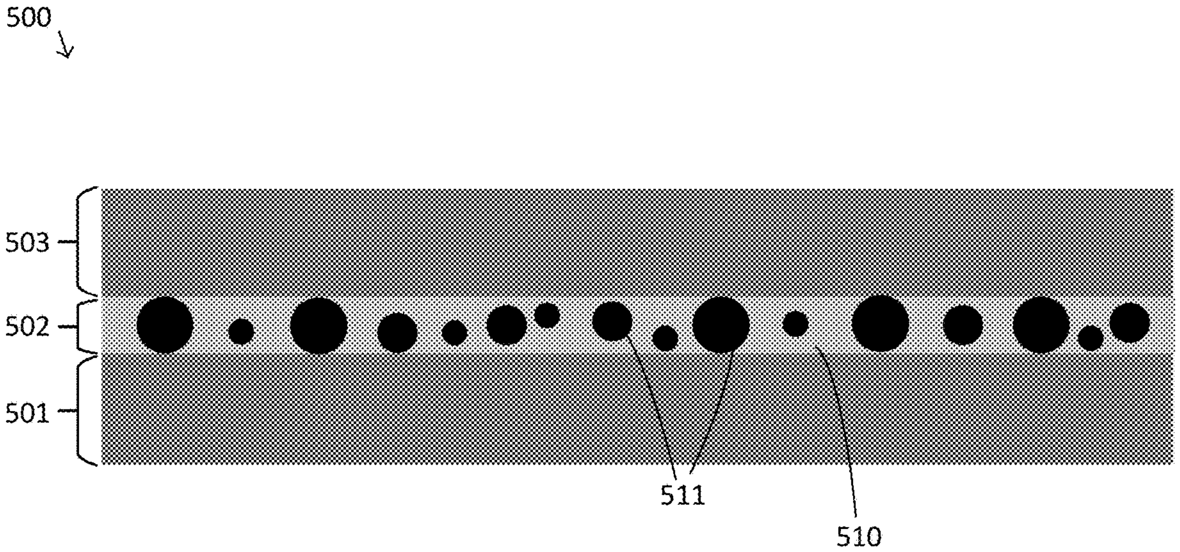
FIG. 5A depicts an interface material comprising large particles with a dimension similar to that of the height of layers formed during fabrication, according to some embodiments.

For instance, as shown in FIG. 5A, material 501 and 503 (each of which may be build material or support material) is formed above and below a layer of interface material 502. The interface material 502 comprises a continuous phase 510 and a discrete phase 511, which is formed from particles that are sized similar to that of the height of layer 502. In some embodiments, the volume occupied by the particles may range from as low as 5% to 15%, to as high as 30% to 60% of the total volume of the interface material. In some embodiments, the volume occupied by the particles may be between 15% and 30% of the total volume of the interface formulation may be preferred.

Figure 5B:
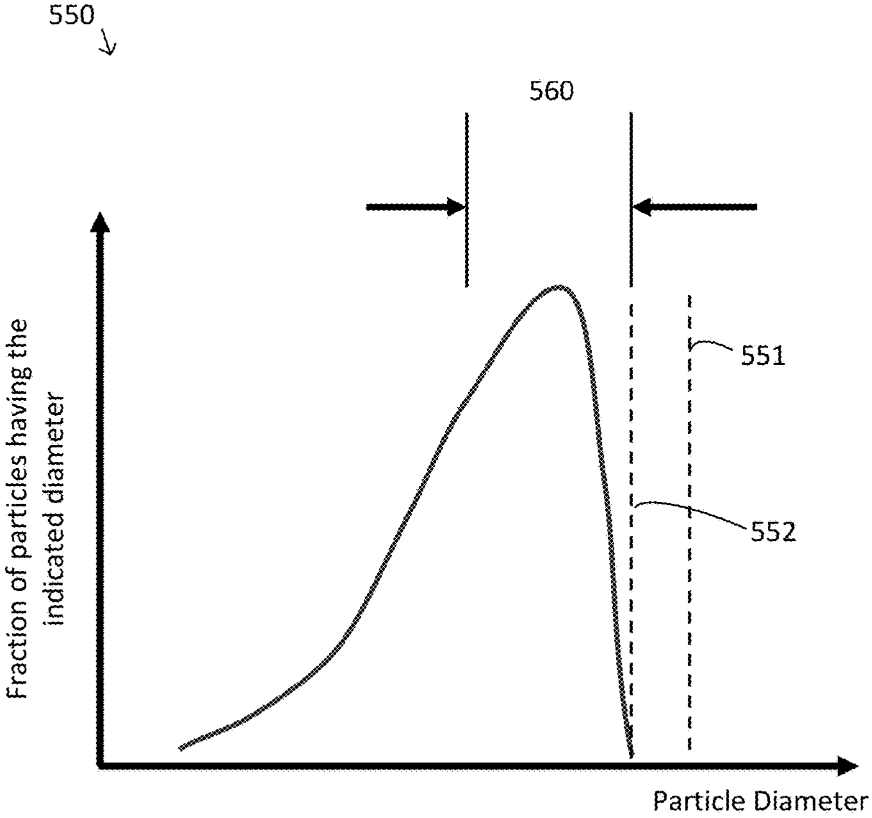
FIG. 5B illustrates a size distribution of the particles of an interface material formulation, according to some embodiments.

As shown in the example of FIG. 5B, a size distribution of the particles of the interface material may be selected such that a desired fraction of the particles have a diameter within a particular range of diameters. Chart 550 depicts an example of a fractional amount of particles in an interface material that have a particular diameter. The size window 560 may be selected to have a particular range of diameters with an upper limit of the size window selected to be the height of the final layer height 552 after thermal processing 560. As a result, a certain percentage of the particles may have a size that is close to the size of the layer height after thermal processing. For example, with a layer height of 0.15 mm, the size window may be selected to be 0.025 mm in width and the particles selected so that at least 90% of the particles are within the size window (i.e., have a diameter between 0.125 mm and 0.15 mm). A layer height of the interface material during fabrication 551 is also shown in the figure.

According to some embodiments, an interface material may comprise solid particles (e.g., ceramics, high melting point metals, or other materials which will resist sintering) where the characteristic size of the solid particles is comparable to the deposited strand height (dimension of the strand in the layering direction). In one embodiment, a thickness of the interface material intervening between the printed part and support structures (or among sections of the printed part) may be equal to, or substantially equal to, to the strand height. In another embodiment, the thickness may be equal to, or substantially equal to, an integer number of strand heights. In another embodiment, the thickness may be equal to, or substantially equal to, a fractional number of strand heights. For instance, the particles may have a dimension (e.g., a diameter) in the range of 30 μm to 70 μm for strands of approximately 50 μm height. The particles may have a dimension (e.g., a diameter) in the range of 90 μm to 170 μm for strands of approximately 150 μm in height. According to some embodiments, the desired particles may be at least as large as 50% of the strand height, and/or may be no larger than 130% of the strand height.

In some embodiments, an interface material may comprise inorganic solid particles having a mean diameter of greater than or equal to 30 μm, greater than or equal to 40 μm, greater than or equal to 50 μm, greater than or equal to 60 μm, greater than or equal to 70 μm, greater than or equal to 80 μm, greater than or equal to 90 μm or greater than or equal to 100 μm. In some embodiments, an interface material may comprise inorganic solid particles having a mean diameter of less than or equal to 100 μm, less than or equal to 90 μm, less than or equal to 80 μm, less than or equal to 70 μm, less than or equal to 60 μm, less than or equal to 50 μm, less than or equal to 40 μm or less than or equal to 30 μm. Combinations of the above-referenced ranges are also possible (e.g., inorganic solid particles having a mean diameter of greater than or equal to 30 μm and less than or equal to 70 μm).

To permit the motion of the large particles during the shrinkage of the part and associated support structure, the loading (volume fraction of large particles per volume of interface material feedstock) may be selected so that the large particles will not substantially interfere during thermal processing of the object. In some embodiments, an interface material may include inorganic solid particles comprising greater than or equal to 5%, greater than or equal to 15%, greater than or equal to 20%, greater than or equal to 25% or greater than or equal to 30% of the interface material by volume. In some embodiments, an interface material may include inorganic solid particles comprising less than or equal to 45%, less than or equal to 30%, less than or equal to 20%, less than or equal to 15% or less than or equal to 10% of the interface material by volume. Combinations of the above-referenced ranges are also possible (e.g., the first discrete phase comprises greater than or equal to 5% and less than or equal to 30% of the interface material by volume, or greater than or equal to 30% and less than or equal to 45% of the interface material by volume).

According to some embodiments, the volume fraction of the inorganic solid particles selected may depend upon the distribution of particles of different sizes. In general, particle distributions which are sharply peaked will required a lower volume fraction. In some embodiments, the large particles may be comprised of smaller particles, such that the large particles are agglomerates of smaller particles. In some embodiments, the smaller particles may have an average size (determined, for example, by the diameter of a sphere enveloping the particles) equivalent to $1/10^{th}$ of the large particles, In some embodiments, the smaller particles may have an average size equivalent to $1/100^{th}$ of the large particles. In some embodiments, the smaller particles may be between 1 and 500 nm in diameter.

According to some embodiments, the solid particles in an interface material in which the characteristic size of the solid particles is comparable to the deposited strand height may comprise one or more inorganic materials, including one or more inorganic materials that remain solid at temperatures during sintering (e.g., above 800° C.). In some embodiments, the solid particles may comprise alumina, mullite, zirconia, aluminum titanate, alumino silicate ceramic, aluminum nitride, magnesium oxide, boron nitride, silicon carbide, silica zircon, or combinations thereof.

According to some embodiments, the interface may be formed at full density, but with a low density of solid particles. The low density of the particles may be large enough that material printed above the particles will be able to bridge from particle to particle, and the density may be low enough that, upon shrinking of the part and support structures, the final density of the interface material is below any ordered and random 2D packing densities of the material used (which will generally depend upon the distribution of particle sizes, and the distribution and type of particle shapes).

In another improved formulation, the interface material comprises particles that are themselves formed from several smaller sub-particles. The combination of the agglomerate volume fraction in the layer and the volume fraction of the sub-particles in the agglomerate give a low total volume fraction of solids within the layer. The agglomerate size can be quite small, enabling some shrinkage even for refractory materials.

The sub-particles in the agglomerate may be joined to form the particle using a binding agent (such as, for example, a polymer as poly(propylene), poly(methyl methacrylate), poly(acrylic), poly(ethylene), poly(acrylic acid), poly(butyl methacrylate), poly(ethylene oxide), poly(vinyl alcohol), or the like), a strong intermolecular interactions (such as, for example, van der Waals forces), and/or by a small amount of material bridging (e.g., lightly sintered). Regardless of the specific joining method, the sub-particles are intended to be chiefly below 5 microns in diameter, preferably below 2 microns in diameter. The reduced size of the sub-particles may decrease the temperature at which the sub-particles will begin to sinter.

Sintering of the sub-particles may have one or more of the following benefits. As the sub-particles sinter, the particle (agglomerate of the many sub-particles) may decrease in size and display a shrinkage. This shrinkage is intended to accommodate the dimensional change of the part and support structure, such that the intervening interface material (composed at least by the agglomerated sub-particles) will also decrease in size.

As used herein regarding the total loading of solids in the intervening interface material (e.g., the entirety of the volume occupied by the sub-particles), loading fractions are stated in terms of the product of the particles within the interface material and the loading of the sub-particles within the agglomerate. By way of non-limiting example, supposing that the volume fraction of the agglomerated particles is 60% of the total volume of the interface material, and the volume of the sub-particles within the agglomerated particles is 60%, then the total volume occupied by the sub-particles within the interface material is 36%.

In cases where the part and support structure are derived from a metallic build powder, one can reasonably expect a 15 to 20% decrease in linear dimension from the initial size of the object to the final size of the object. The amount of decrease in linear dimension from the initial size of the object to the final size of the object may depend upon the amount of build material powder (e.g., metal powder, ceramic powder) loaded into a volume occupied by the build material powder. In some embodiments, the shrinkage may range from 5% to 10%, 10% to 15%, 15% to 20%, or 20% to 30%, in each case depending upon the initial loading of the metallic build powder prior to thermal processing.

Since the material comprising the solids in the interface material will not tend to sinter (or will tend to sinter to a lesser extent than the metal, in a manner to not achieve a density equaling or surpassing that of the metal), the loading of solids within the interface material must be selected to accommodate the shrinkage of the part and support structures. The shrinkage may be accommodated through several mechanisms: (i) the initial (low) solids loading of the interface material feedstock means that once the low temperature components (e.g., polymer particles, continuous polymer, or polymer blend) are removed the remaining solid particles can move with minimal constraint; and/or (ii) localized sintering of the solid particles comprising the interface.

Without wishing to be bound by theory, it is understood that the agglomerated interface particles will tend to sinter inward—toward the center of each agglomerate particle—rather than sintering to form bridges across adjacent agglomerates. This behavior likely follows from the spacing between neighboring agglomerates, as opposed to the intimate contact shared by sub-particles which form each agglomerate. The intimate contact shared by the sub-particles is required for sintering, whereas the spacing between the agglomerated bodies limits the possible mass transport mechanism required for densification and shrinkage of neighboring agglomerates to one body. In some embodiments, the volume fraction of the agglomerated particles may be chosen to reduce the physical contact between neighboring agglomerates. The threshold for geometric percolation of equally sized spheres being within the range from 25% to 30% volume fraction.

The sub-particles within the agglomerates may comprise any suitable material or materials. For instance, sub-particles may comprise alumina (alpha phase, gamma phase, or other phase), titania (titanium dioxide), zirconia, toughened zirconia, boron nitride, yttria stabilized zirconia, clay (for example, bentonite, kaolin, smectite, montmorillonite), colloidal alumina, colloidal silica, fumed silica, fumed alumina, diatomaceous earth, or combinations thereof. A sub-particle may comprise multiple different materials; in addition, an agglomerate may comprise sub-particles with different material compositions.

Figure 6:
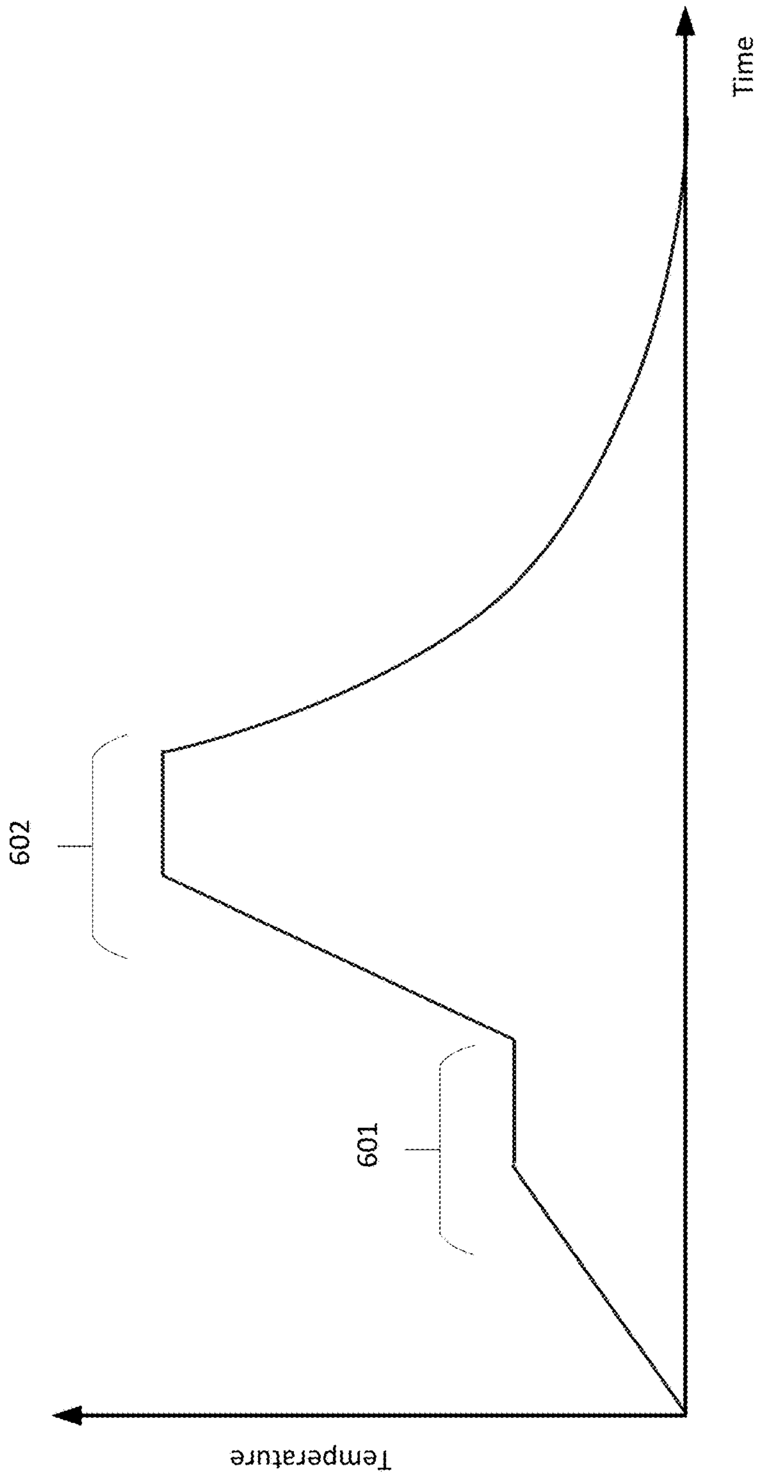
FIG. 6 depicts stages of thermal processing of a part comprising an improved interface material, according to some embodiments.

In any of the above-described formulations of an interface material, the following process may occur during thermal processing, as illustrated in FIG. 6. In the example of FIG. 6, the temperature of a thermal process (e.g., sintering in a furnace) is shown over time. In a first stage 601, any fugitive phases (e.g., particles of a polymer) embedded in a continuous phase as described above may be removed through thermal processes which may for instance include pyrolysis. At higher temperatures in a second stage 602, the part and support structures may begin to sinter and densify. Due to the aforementioned improvements to the interface formulation, the interface material may accommodate any strain associated with the part and support structure shrinkage, while simultaneously minimally impacting the ability of the part and the support structure to shrink or otherwise change in dimension.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms “approximately” and “about” may be used to mean within ±20% of a target value in some embodiments, within ±10% of a target value in some embodiments, within ±5% of a target value in some embodiments, and yet within ±2% of a target value in some embodiments. The terms “approximately” and “about” may include the target value. The term “substantially equal” may be used to refer to values that are within ±20% of one another in some embodiments, within ±10% of one another in some embodiments, within ±5% of one another in some embodiments, and yet within ±2% of one another in some embodiments.

The term “substantially” may be used to refer to values that are within ±20% of a comparative measure in some embodiments, within ±10% in some embodiments, within ±5% in some embodiments, and yet within ±2% in some embodiments. For example, a first direction that is “substantially” perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

What is claimed is:

1. A composition for additive fabrication, the composition comprising:

a continuous phase;

particles of a first material embedded within the continuous phase, the first material including a thermoset polymer and/or a thermoplastic; and particles of an inorganic material embedded within the continuous phase, wherein the particles of the first material and the particles of the inorganic material combined are present in an amount between 40% and 75% by volume of the composition.

2. The composition of claim 1, comprising the particles of the first material and the particles of the inorganic material combined in an amount between 50% and 70% by volume of the composition.

3. The composition of claim 2, comprising the particles of the first material and the particles of the inorganic material combined in an amount between 55% and 63% by volume of the composition.

4. The composition of claim 1, comprising the particles of the first material in an amount between 15% and 25% by volume of the composition.

5. The composition of claim 1, comprising the particles of the inorganic material in an amount between 35% to 45% by volume of the composition.

6. The composition of claim 1, wherein the first material includes a thermoset polymer.

7. The composition of claim 6, wherein the first material includes a poly (ester), a poly (urethane), a poly (urea), melamine, and/or an epoxy-based polymer.

8. The composition of claim 1, wherein the first material includes a partially or fully cross-linked thermoplastic.

9. The composition of claim 8, wherein the first material includes poly (styrene), poly (methacrylate), poly (propylene), poly (ethylene), poly (sulfone), poly (etherimide), poly (amideimide), poly (phenylsulfone), poly (phenelyne sulfide), poly (etheretherketone), poly (etherketone), and/or poly (phthalamide).

10. The composition of claim 1, wherein the inorganic material includes one or more ceramics.

11. The composition of claim 1, wherein the inorganic material includes alumina, mullite, zirconia, aluminum titanate, alumino silicate ceramic, aluminum nitride, magnesium oxide, boron nitride, silicon carbide, and/or silica zircon.

12. The composition of claim 1, wherein the particles of the inorganic material have a mean diameter between 20 μm and 60 μm.

13. The composition of claim 1, wherein the continuous phase comprises a wax and/or a waxy alcohol.

14. The composition of claim 13, wherein the continuous phase further comprises one or more polyolefin polymers and/or thermoplastic elastomers.

15. The composition of claim 1, wherein the particles of the first material and the particles of the inorganic material are dispersed throughout the continuous phase.

16. An interface material composition for use in Fused Filament Fabrication (FFF), the composition comprising:
- a continuous phase comprising:
  - a wax and/or a waxy alcohol; and
  - an olefinic polymer and/or thermoplastic elastomer;
- particles of a first material embedded within the continuous phase and dispersed throughout the continuous phase, the first material including a thermoset polymer and/or a thermoplastic; and
- particles of an inorganic material embedded within the continuous phase and dispersed throughout the continuous phase,
- wherein the particles of the first material are present in an amount greater than or equal to 15% and less than or equal to 25% by volume of the composition, and
- wherein the continuous phase is present in an amount greater than or equal to 35% and less than or equal to 45% by volume of the composition.

17. The interface material composition of claim 16, comprising the particles of the inorganic material in an amount between 35% to 45% by volume of the composition.

18. The interface material composition of claim 16, wherein the inorganic material includes alumina, mullite, zirconia, aluminum titanate, alumino silicate ceramic, aluminum nitride, magnesium oxide, boron nitride, silicon carbide, and/or silica zircon.

19. The interface material composition of claim 16, wherein the particles of the inorganic material have a mean diameter between 20 μm and 60 μm.

20. The interface material composition of claim 16, wherein the first material includes a partially or fully cross-linked thermoplastic.

* * * * *